(12) United States Patent
Fitzgibbon et al.

(10) Patent No.: US 7,042,183 B2
(45) Date of Patent: May 9, 2006

(54) BARRIER MOVEMENT OPERATOR SPEED CONTROL

(75) Inventors: James J. Fitzgibbon, Batavia, IL (US); Robert Keller, Chicago, IL (US); Edward Laird, Lombard, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 282 days.

(21) Appl. No.: 10/622,214

(22) Filed: Jul. 18, 2003

(65) Prior Publication Data

US 2005/0012488 A1 Jan. 20, 2005

(51) Int. Cl.
*H02P 1/00* (2006.01)

(52) U.S. Cl. .................. 318/445; 318/466; 318/468; 318/280; 318/432; 49/26; 49/28

(58) Field of Classification Search ................ 318/445, 318/443, 466, 468, 280–283, 432, 434, 6; 49/26, 28
See application file for complete search history.

(56) References Cited

U.S. PATENT DOCUMENTS

| | | | | |
|---|---|---|---|---|
| 3,262,105 A | * | 7/1966 | Bell | .................. 340/870.19 |
| 3,710,218 A | | 1/1973 | Roundy et al. | |
| 4,527,663 A | | 7/1985 | Nomura | |
| 5,334,922 A | | 8/1994 | Manini | |
| 5,963,000 A | * | 10/1999 | Tsutsumi et al. | ........... 318/480 |
| 6,082,433 A | | 7/2000 | Vafaie et al. | |
| 6,092,338 A | * | 7/2000 | Crowner et al. | .............. 49/360 |
| 6,172,475 B1 | | 1/2001 | Fitzgibbon et al. | |
| 6,194,851 B1 | | 2/2001 | Denault et al. | |
| 6,559,757 B1 | * | 5/2003 | Deller et al. | ........... 340/310.01 |
| 6,597,138 B1 | * | 7/2003 | Fitzgibbon | .................. 318/434 |

OTHER PUBLICATIONS

"How Dimmer Switches Work" 3 pages Harris, Tom. Jun. 26, 2003. <http://home.howstuffworks.com/dimmer-switch3.htm>.
"Triac" 4 pages Jun. 25, 2003. <http://www.tpub.com/neets/book7/26e.htm>.
"Triac Control Using the COP400 Microcontroller Family" *National Semiconductor*. COP Note 6. Feb. 1981.

* cited by examiner

*Primary Examiner*—Rina Duda
(74) *Attorney, Agent, or Firm*—Fitch, Even, Tabin & Flannery

(57) ABSTRACT

Methods and apparatus for controlling the speed of an A.C. induction motor are disclosed and shown in operation for controlling the movement of a barrier. Included are voltage configuration circuits which selectively gate portions of the half-cycles of AC mains voltage to the induction motor. When the motor is started increasing amounts of mains AC voltage is applied to the motor and decreasing portions of the mains AC are applied to the motor during a stopping routine. The motor can also be energized with less than full mains AC to permit differences in barrier movement speed dependent on operating parameters.

36 Claims, 12 Drawing Sheets

BARRIER MOVEMENT OPERATOR SPEED CONTROL

BACKGROUND OF THE INVENTION

The present invention relates to variable speed induction motors and the use of such in barrier movement operators.

Barrier movement operators, such as gate and garage door operators comprise an electric motor connected to move a barrier between at least open and closed limits. In controlling the movement of the barrier, the motor and the barrier must be started in motion from rest and stopped from motion into the rest state. Sometimes, as is the case when an obstruction is in the path of the barrier, the barrier must be stopped then started again in a reverse direction. When the electric motor moving a barrier stops and/or starts abruptly the inertia of the at rest or moving barrier creates large forces. Such forces potentially reduce the lifetime of the barrier movement operator and create audible and visual appearances that the barrier movement operator is straining. Also, it may be desirable to move the barrier at different speeds during travel along different parts of the path of travel. For example, it may be desired to open the barrier at a faster speed than when it is closing.

Some DC motor powered systems, such as that described in PCT/US02/24385, build up and diminish the power (torque) applied by the motor when the motion of the barrier is changed. Such building-up and diminishing may be done by timed increases and decreases of a DC voltage level or by pulse width modulating the DC power. DC motors require a powerful and costly source of DC voltage, relatively complex control circuitry and the more expensive DC motor itself. A need exists for methods and apparatus to control the power to an A.C. induction motor of a barrier movement operator in response to barrier control input signals.

DESCRIPTION

Figure 1:
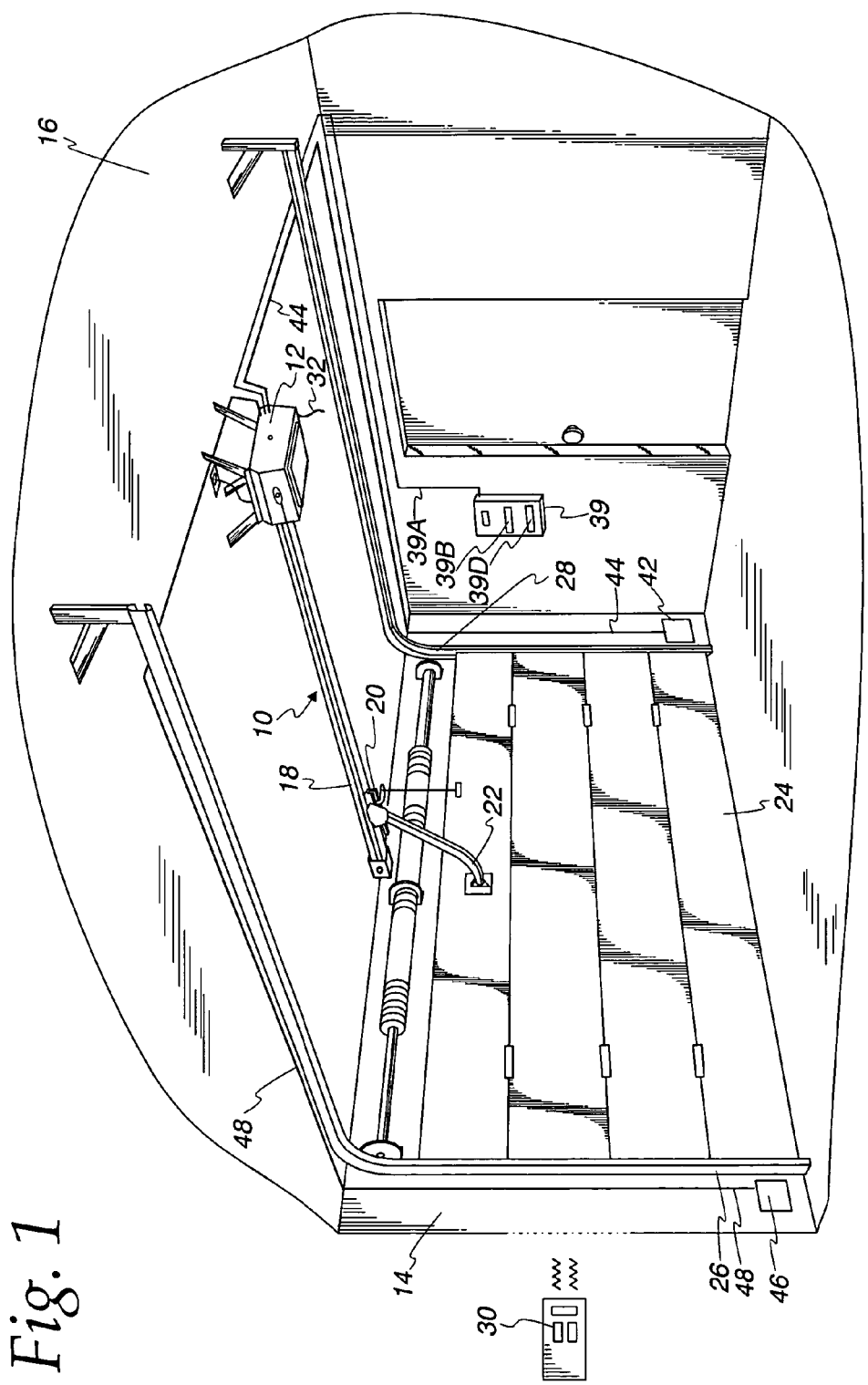
FIG. 1 is a perspective view of a garage having mounted within it a garage door operator embodying the present invention.

Referring now to the drawings and especially to FIG. 1, more specifically a movable barrier operator or garage door operator is generally shown therein and referred to by numeral 10 includes a head unit 12 mounted within a garage 14. More specifically, the head unit 12 is mounted to the ceiling 16 of the garage and includes a rail 18 extending therefrom with a releasable trolley 20 attached having an arm 22 extending to a multiple paneled garage door 24 positioned for movement along a pair of door rails 26 and 28. The system includes a hand-held transmitter unit 30 adapted to send signals to an antenna 32 positioned on the head unit 12 and coupled to a receiver 80 as will appear hereinafter. A switch module 39 is mounted on a wall of the garage. The switch module 39 is connected to the head unit 12 by a pair of wires 39a. The switch module 39 includes a light switch 39b and a command switch 39d. An optical emitter 42 is connected via a power and signal line 44 to the head unit. An optical detector 46 is connected via wire 48 to the head unit 12.

Figure 2:
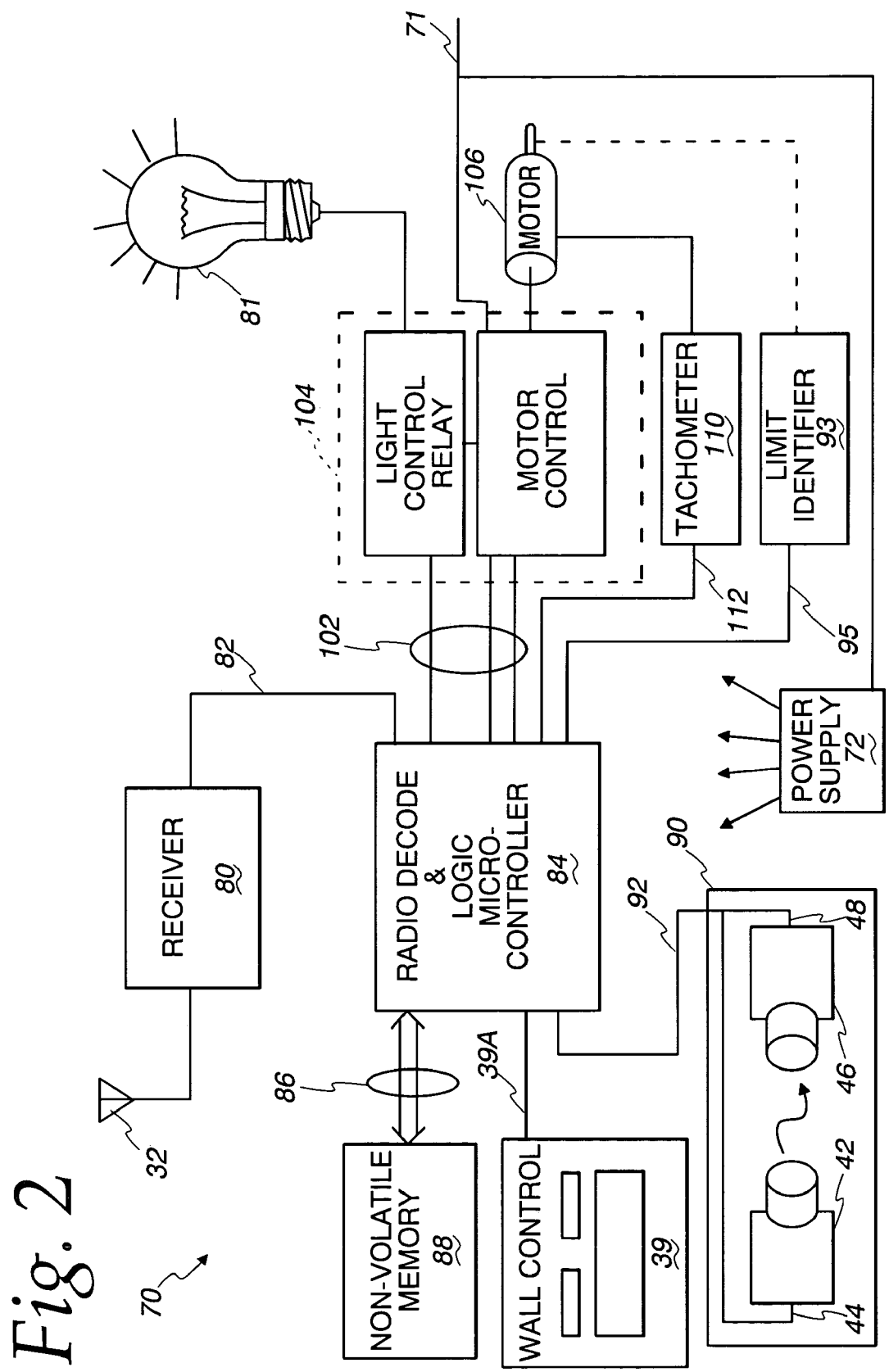
FIG. 2 is a block diagram of a controller mounted within the head unit of the garage door operator employed in the garage door operator shown in FIG. 1.

As shown in FIG. 2, the garage door operator 10, which includes the head unit 12 has a controller 70 which includes the antenna 32. The controller 70 includes a power supply 72 (FIG. 4) which receives alternating current from an alternating mains voltage source, such as 120 volt AC (71) and converts the alternating current to required levels of DC voltage. The controller 70 includes an RF receiver 80 coupled via a line 82 to supply demodulated digital signals to a microcontroller 84. The receiver 80 is energized by a power supply 72. The microcontroller is also coupled by a bus 86 to a non-volatile memory 88, which non-volatile memory stores user codes, and other digital data related to the operation of the control unit 70. An obstacle detector 90, which comprises the emitter 42 and infrared detector 46 is coupled via the obstacle detector bus 92 to the microcontroller. The obstacle detector includes lines 44 and 48. The wall switch 39 is connected via the connecting wires 39a to the microcontroller 84.

The microcontroller 84, in response to switch closures and received codes, will send signals over a logic line 102 to a logic module 104 connected to an alternating current motor 106 having a power take-off shaft 108 coupled to the transmission 18 of the garage door operator. A tachometer 110 is coupled to the shaft 108 and provides an RPM signal on a tachometer line 112 to the microcontroller 84; the tachometer signal being indicative of the speed of rotation of the motor. A limit identifier 93 which identifies the position of the movable barrier along its path of travel. Limit identifier may comprise limit switches or a software function to count tachometer signals to identify barrier position. The limit switches are shown in FIG. 2 as a functional box 93 connected to microcontroller 84 by leads 95. AC supply line 71 is also coupled to microcontroller 84 to identify the phase of the alternating current on the supply line.

Figure 3A:
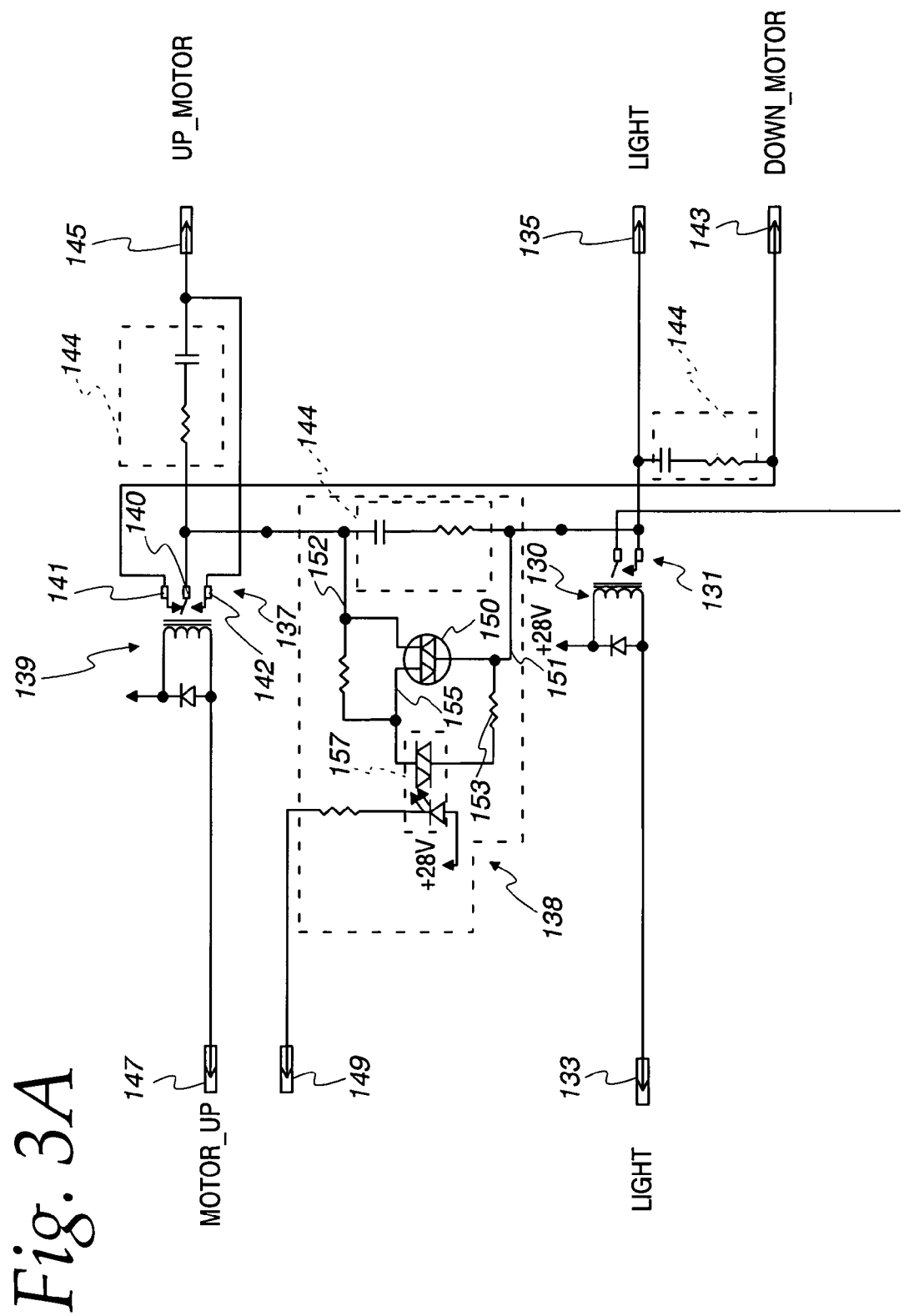
FIGS. 3A and 3B are circuit diagrams of a motor control used in the head-end controller.
Figure 3B:
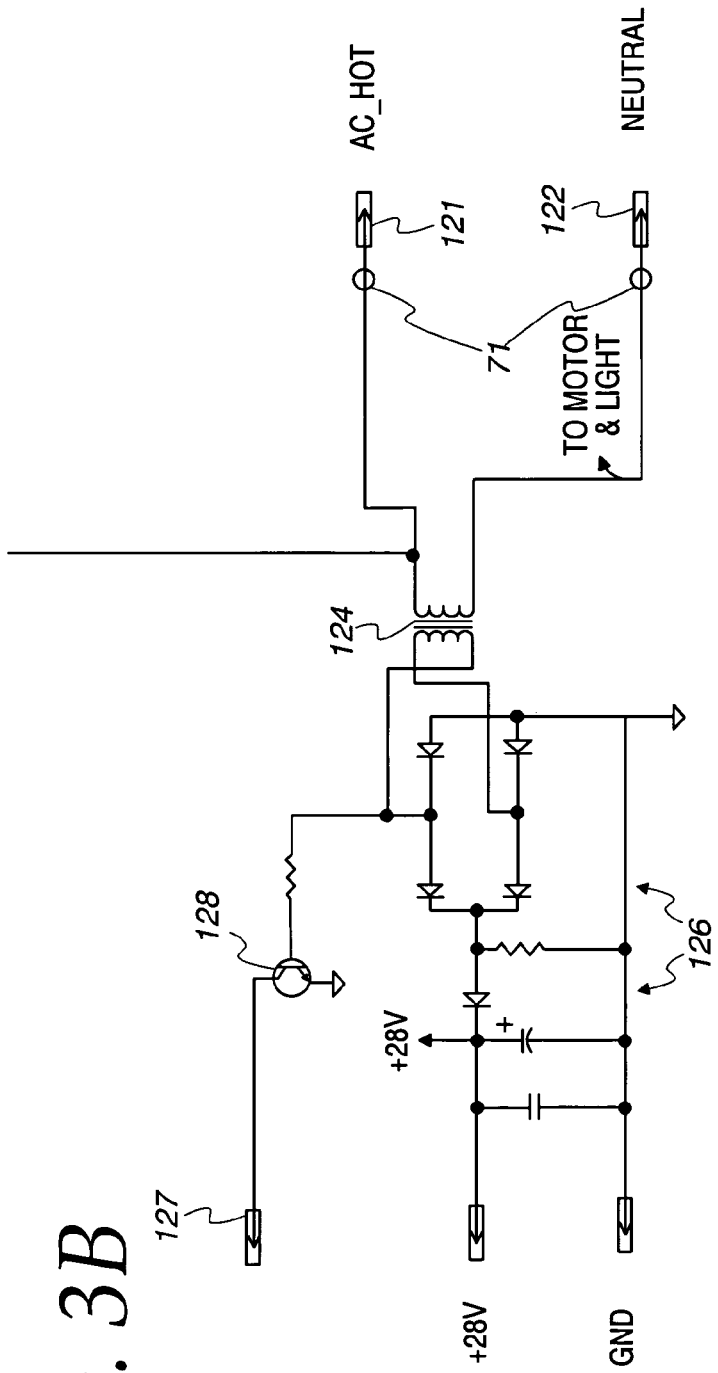

Logic unit 104 is illustrated in schematic form in FIGS. 3A and 3B. AC mains voltage is applied between input terminals 121 and 122 of logic unit 104 and voltages derived from the AC mains voltage are used to control the direction and speed of barrier motion and to illuminate light 81. The AC mains voltage used herein is the common 60 HZ 120V AC of Public Distribution departments. As such, it is basically a sine wave having 60 cycles per second, each cycle being comprised of two half cycles of alternating polarity. Incoming AC voltage is applied via a step down transformer 124 to rectifying and filtering circuitry 126 to produce a DC voltage for powering various circuitry of the control 70. Additionally, a portion of the stepped down voltage wave form is sent via a transistor 128 and output port 127 to microcontroller 84. The wave form at port 127 is used by microcontroller 84 to produce gating signals in synchronism with the AC mains voltage. Although the present description relates to 60 HZ 120V AC the principles taught can easily be applied to other frequencies e.g., 50 HZ and other voltages e.g., 240.

Logic unit 104 is illustrated in schematic form in FIG. 3. AC mains voltage is applied between input terminals 121 and 122 of logic unit 104 and voltages derived from the AC mains voltage are used to control the direction and speed of barrier motion and to illuminate light 81. The AC mains voltage used herein is the common 60 HZ 120V AC of Public Distribution departments. As such, it is basically a sine wave having 60 cycles per second, each cycle being comprised of two half cycles of alternating polarity. Incoming AC voltage is applied via a step down transformer 124 to rectifying and filtering circuitry 126 to produce a DC voltage for powering various circuitry of the control 70. Additionally, a portion of the stepped down voltage wave form is sent via a transistor 128 and output port 127 to microcontroller 84. The wave form at port 127 is used by microcontroller 84 to produce gating signals in synchronism with the AC mains voltage. Although the present description relates to 60 HZ 120V AC the principles taught can easily be applied to other frequencies e.g., 50 HZ and other voltages e.g., 240.

The common or neutral conductor conveying mains voltage to input terminal 122 is also connected to a common input of light 81 and motor 106. The hot input terminal 121 is connected to one terminal of a normally open contact set 131 of a light control relay 130. Whenever the light 81 is to be illuminated microcontroller 84 grounds light input terminal 133 causing DC current to flow through relay 130 closing the contact set 131. Light 81 is connected to a terminal 135 of logic unit 104 to receive AC voltage from relay contact set 131 whenever relay 130 is operating to close contact set 131.

The voltage applied to light output terminal 135 is also applied via a voltage configuring circuit 138 to the center contact 140 of a double throw contact set 137 of a relay 139. The normally closed contact 141 of relay 139 is connected to a down motor output terminal 143 and normally open contact 142 is connected to an up motor output terminal 145. By operation of relay the voltage output of voltage configuration circuit 138 is applied to terminal 143 (down motor) when relay 139 is at rest and it is applied to output terminal 145 (up motor) when the relay 139 is energized. Relay 139 is energized when microcontroller 84 applies ground to input terminal 147. Output terminals 143 and 145 are connected to down and up power input terminals of motor 106.

The voltage configuration circuit 138 is controlled by microcontroller 84 via input signals at terminal 149 to pass portions of the mains AC voltage on to relay contact 140 (relay 137). In the arrangement described herein microcontroller 84 provider input signals to terminal 149 to control voltage controlling circuit 138 to pass voltage to contact 140 which has a varying effective base frequency and a varying effective voltage. The main conductor path for AC voltage through the voltage configuration circuit 138 comprises conductor 151 to a main terminal of a triac 150 and conductor 152 which connects the other main terminal of triac 150 to relay contact 140. Resistor and capacitor configurations 144 in FIG. 3 are used in several known places to provide circuit protection and electrical noise reduction and could be eliminated from the circuit if these characteristics are not important. The gate input 155 to triac 150 is connected to a main terminal of an opto-triac 157, the other main terminal of which is connected via a resistor 153 to receive mains AC voltage from relay 130. Voltage is gated between the main terminals of opto-triac 157 whenever input terminal 149 is controlled by microcontroller 84 to provide a conductive path to ground. By the arrangements described, whenever relay contacts 131 are closed and microcontroller 84 provides a conductive path to ground at terminal 149, a portion of an AC one-half cycle will be passed on to relay contact 141 for application to motor 106.

Microcontroller 84 controls the motor 106 by controlling the application of voltage to the motor relay 130, by controlling whether an up or a down winding of the motor 106 is energized relay 139 and by controlling the nature of the energizing voltage (voltage configuration circuit 138). To move the barrier open (upward) microcontroller 84 closes relay contact 131, controls voltage configuration circuit 138 to provide a desired configuration of output voltage and controls relay 139 to close relay contact 140 and 142. To move the barrier toward the closed position microcontroller 84 closes relay contact 131, controls voltage configuration circuit 138 to provide appropriate voltage and allows relay 139 to stay in the inactive state in which contact 140 and 141 are normally closed. Whenever the motor is to be stopped relay 130 may be opened or configuration circuit 138 can be controlled to pass no significant voltage to relay contact 140.

Voltage configuration circuit 138 operates under the control of microcontroller 84 to pass any portions of the incoming mains AC voltage which the microcontroller is programmed to pass. When full AC voltage is to be sent to motor control relay 139, input 149 is grounded for the period of time that full voltage is to be sent. The grounding of terminal 149 causes a representation of the AC voltage on conductor 151 to be presented to gate conductor of triac 150 to which triac 150 responds by conveying nearly all of the voltage on main terminal conductor 151 to main terminal conductor 152. When the ground connection at terminal 149 is removed, no voltage is applied to terminal 140.

Figure 4A:
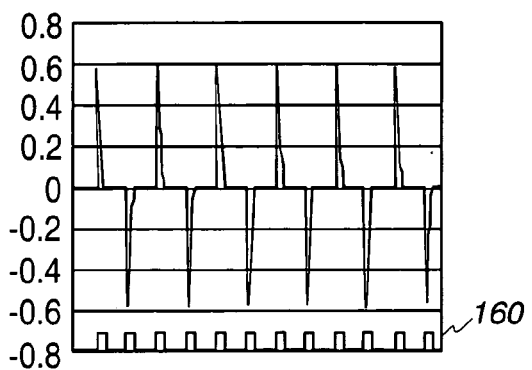
FIGS. 4A–E are wave forms for an example of gating A.C. voltage to an induction motor to sequentially increase (decrease) the effective applied voltage.
Figure 4B:
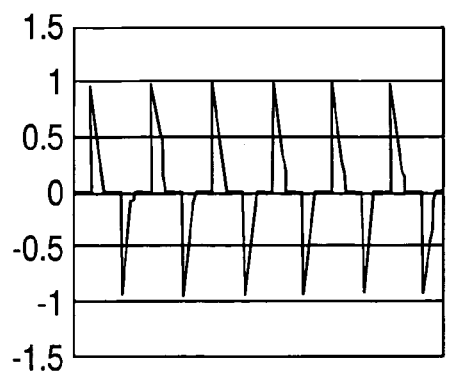
Figure 4C:
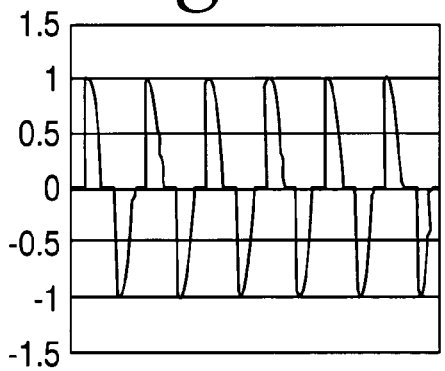
Figure 4D:
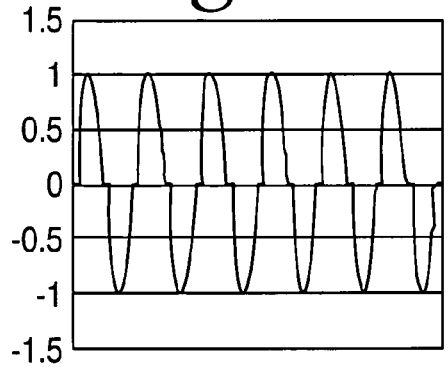

FIGS. 4A–E represent one example of controlling the effective voltage applied to terminal 140. FIG. 4–E represents both the input AC mains sine wave as well as the output sine wave which will occur when terminal is grounded continuously for a period of time. FIG. 4A represents the application of a small (with respect to FIG. 4E) effective voltage to terminal 140. It will be remembered that microcontroller 84 receives a representation of the AC mains voltage on a terminal 127 from which the timing of the half cycles of the AC mains voltage is determined. The wave form of FIG. 4A is achieved by grounding terminal 149 a predetermined period of time before the next zero crossing of the AC mains voltage. The period of grounding should not be so large as to be in effect at the next zero crossing of the mains voltage. The grounding causes the voltage applied to terminal 140 to reach substantially the full AC mains voltage level until the next zero crossing. When the current reaches zero the triac 150 ceases to conduct and will not begin again until the next grounding of terminal 149. The line of pulses 160 on FIG. 4A represents the times for grounding the input terminal 149. FIG. 4B represents a higher effective voltage and is achieved by grounding terminal 149 with a slightly greater period of time remaining before the next zero crossing than existed in FIG. 4A. FIGS. 4C and 4D represent step increases in the effective voltage and as before are achieved by gating more of each applied half-cycle. Finally, in FIG. 4E the input 149 is substantially continuous grounded and the entire mains voltage is passed. FIGS. 4A–E represent a small number of incremental increases in the effective voltage for purposes of illustration. When a barrier is beginning to move it may be desirable to control voltage configuration circuit 138 to produce many, e.g., 128, incremental increases in effective voltage during the first 1–4 seconds of barrier motion.

Figure 4E:
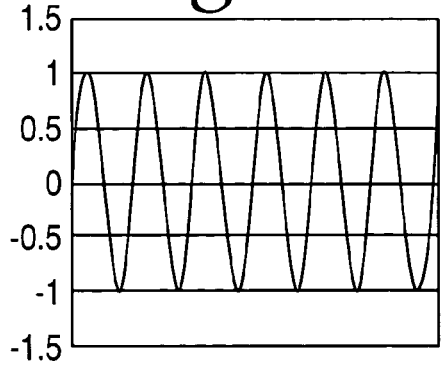

The description above refers to increasing barrier speed by controlling voltage configuration circuit 138 by progressing from FIG. 4A to 4E. The barrier can be gradually slowed by reversing the sequence from maximum speed e.g., FIG. 4E and reducing the effective voltage by working backward through FIG. 4D to FIG. 4A. The long term speed of barrier movement can also be controlled by the apparatus and methods discussed herein. Moving the barrier in the open direction may be achieved by progressing through the incremental effective voltage increases ending at the full AC mains voltage (FIG. 4E). This maximum voltage would result in a maximum speed of the barrier. On the other hand, when closing the barrier the effective voltage may only be increased to FIG. 4C as a maximum in which case the barrier would move more slowly than in the opening direction.

Figure 5A:
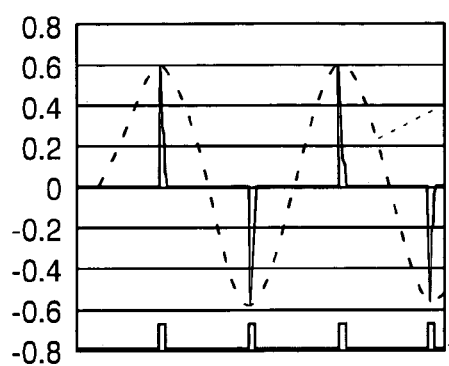
FIGS. 5A–P are wave forms for a first example of sequentially increasing (decreasing) the effective frequency and effective voltage applied to an A.C. motor.
Figure 5B:
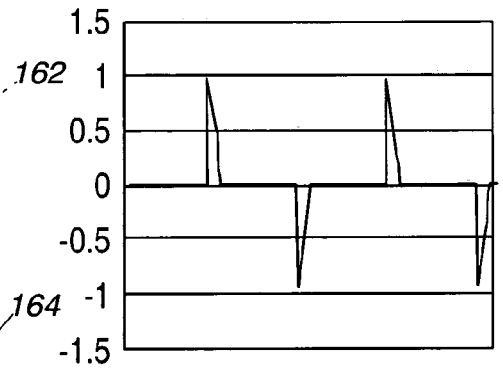
Figure 5C:
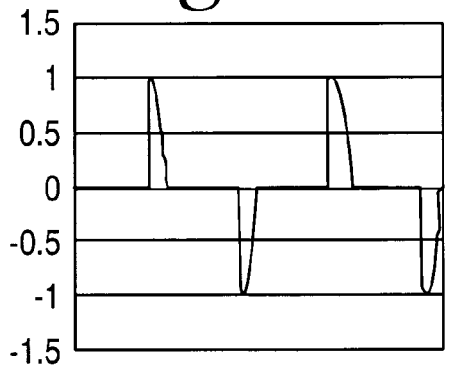
Figure 5D:
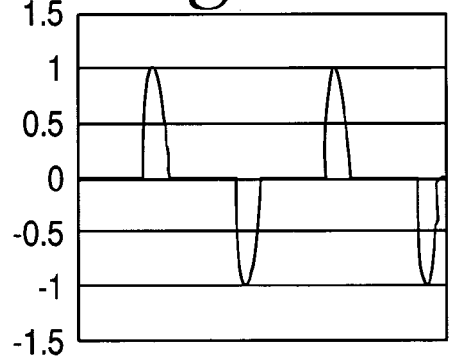
Figure 5E:
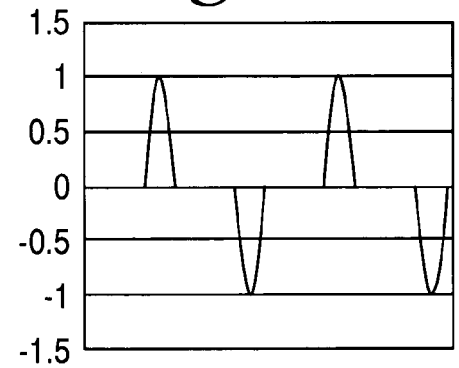
Figure 5F:
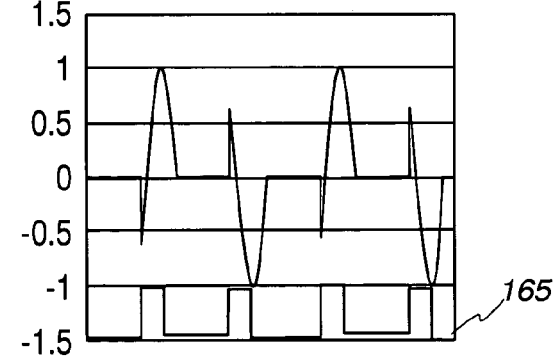
Figure 5G:
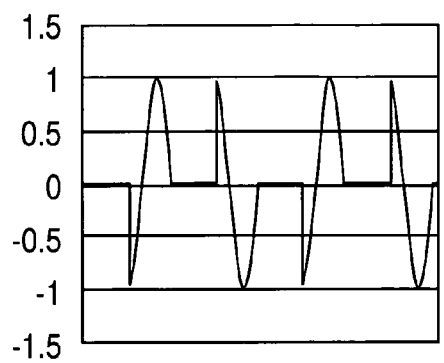
Figure 5H:
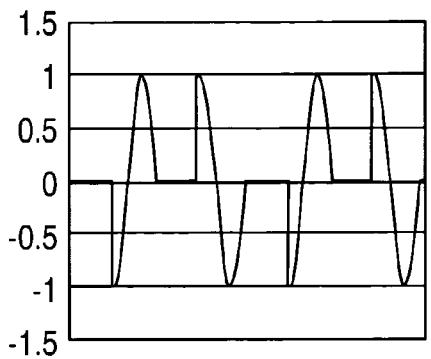
Figure 5I:
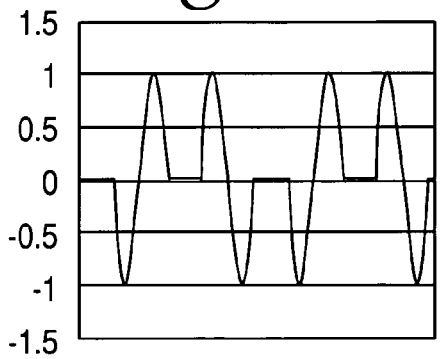
Figure 5J:
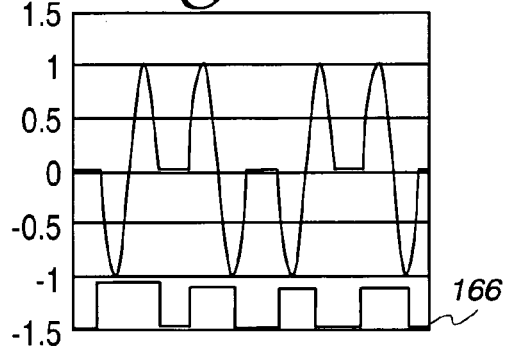
Figure 5K:
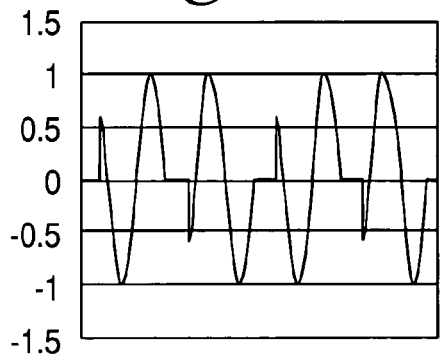
Figure 5L:
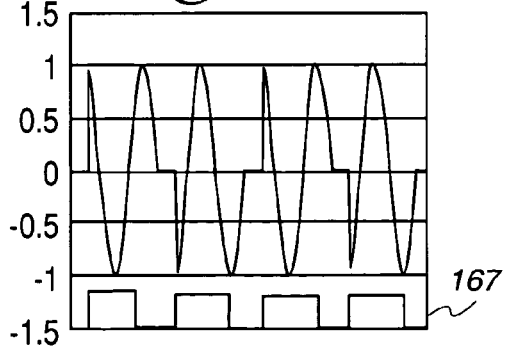
Figure 5M:
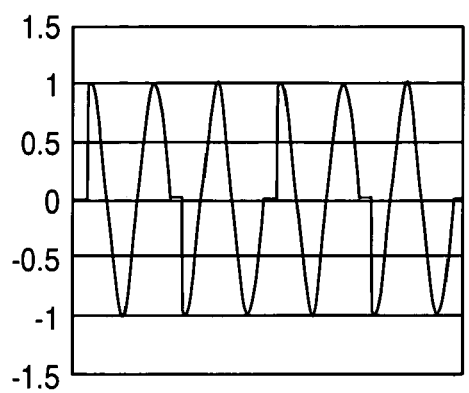
Figure 5N:
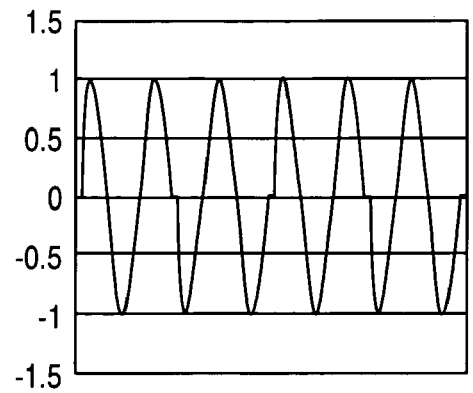
Figure 5P:
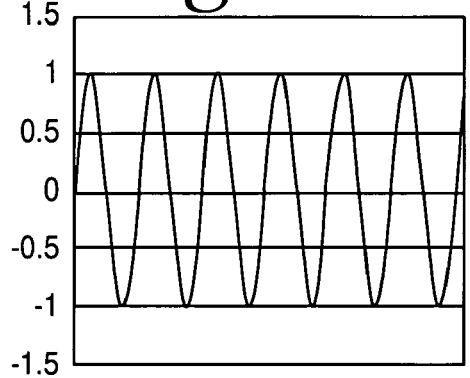

The examples represented by FIGS. 4A–E describe gradually changing the effective voltage applied to an AC induction motor 106 to slowly accelerate a barrier as well as slow it down and run at a chosen speed. FIGS. 5A–P provide examples by which both the effective voltage and the effective frequency of voltage applied to a motor are controlled. Such may provide finer control over the barrier movement speed.

As in the preceding example with regard to FIG. 4A–E the FIG. 5P represents both the mains AC voltage as well as the output of the voltage configuration circuit at maximum effective frequency and effective applitude. In FIG. 5A which represents a low effective frequency and a low effective voltage a portion of every third half-cycle is gated to the terminal 140. This reduces the effective frequency to that represented by the dashed line wave 162 in FIG. 5A. The gating pulses to create the wave of FIG. 5A are shown on a line 164. The length of the gating pulses is sequentially increased as before to create the resultant waves of FIGS. 5B–5E. The beginning of each gating pulse defines the beginning of the voltage pulse passed to terminal 140 and the end occurs during a half cycle for which voltage passing should cease at the next zero crossing. As shown in FIGS. 5F through 5J the gating pulses 165 and 166 extend into two consecutive half-cycles. As the gating pulses continue to lengthen they extend into three consecutive half-cycles until, in FIG. 5P, the gating pulses lengthen to become continuous gating the entire sine wave. As represented in FIG. 5 the gating process begins with every third half-cycle and gradually increases until the entire source wave (FIG. 5P) is sent to the motor. In the beginning (FIG. 5A) only a small effective voltage is gated at a reduced effective frequency 162. As gating increases the effective frequency increases as does the effective voltage. The sequence of FIGS. 5A–P presents representative samples of the actual wave forms created. As with the example of FIG. 4, further change can stop at any of the wave forms for a steady speed slower than full speed (FIG. 5P) and the motor can be slowed by performing the steps of the example in reverse.

In the preceding discussion of FIGS. 5A–P the wave form created is discontinuous. Accordingly, a fourier transform of the wave will show a base frequency and a number of harmonics. As longer and longer portions of a half-cycle are passed, the base frequency will remain, but other frequencies and harmonics will appear and their magnitude will change. At some point in the progression, as more and more of additional half-cycles are coupled to the motor, the original base frequency will diminish in significance to be replaced with higher base frequencies. Thus, by changing the wave shape of the applied signal as shown in FIGS. 5A–P the effective frequency to which the motor responds is changed.

In the example of FIG. 5 the effective frequency was reduced by beginning to gate portions of every third half-cycle and increasing the amount gated. Greater initial effective frequency reductions can be achieved if the initial step involves the gating of every $N^{th}$ half-cycle where N is an odd integer greater than one. The gating of odd half cycles guarantees that one will be a positive half-cycle and the subsequent half-cycle will be negative to balance out any significant DC component of the gated signal.

Figure 6A:
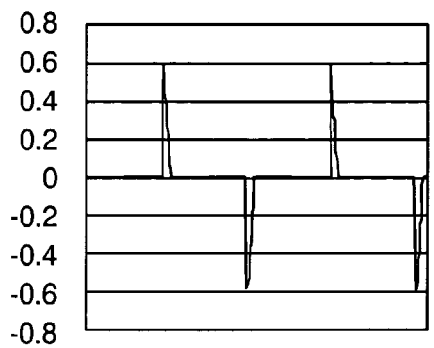
FIGS. 6A–P are wave forms for a second example of sequentially increasing (decreasing) the effective frequency and effective voltage applied to an A.C. motor.
Figure 6B:
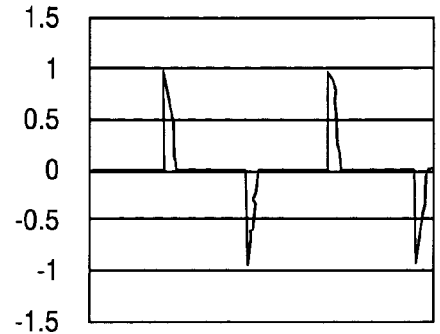
Figure 6C:
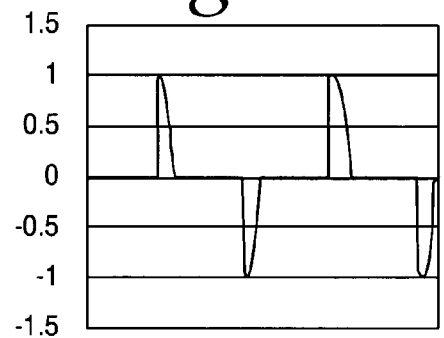
Figure 6D:
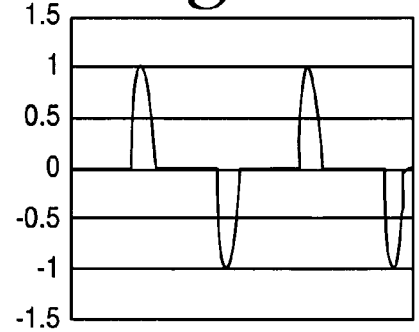
Figure 6E:
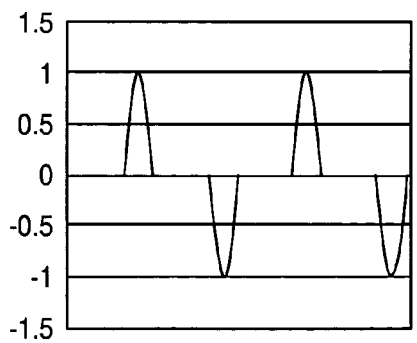
Figure 6F:
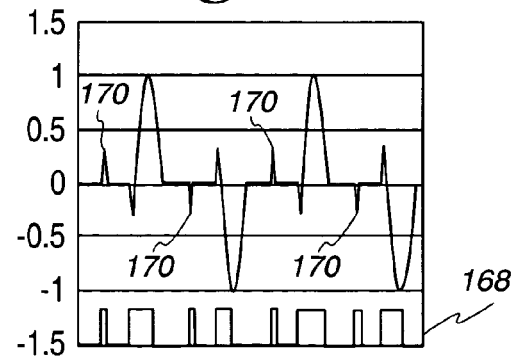
Figure 6G:
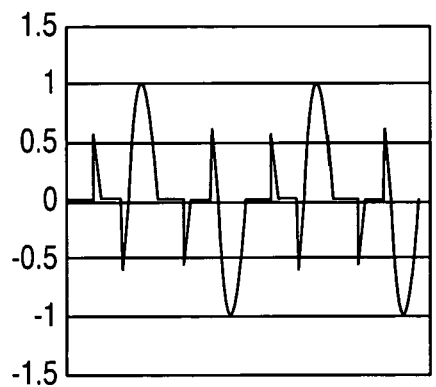
Figure 6H:
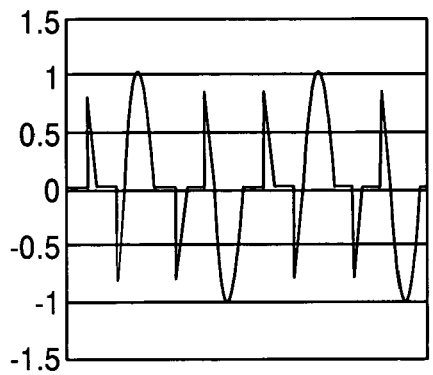
Figure 6I:
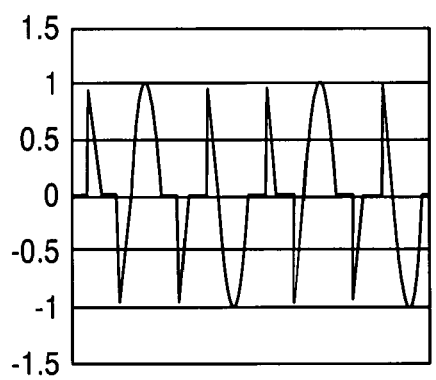
Figure 6J:
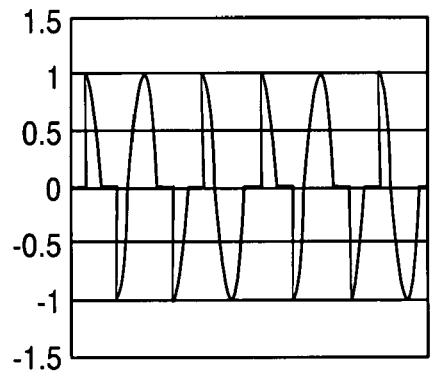
Figure 6K:
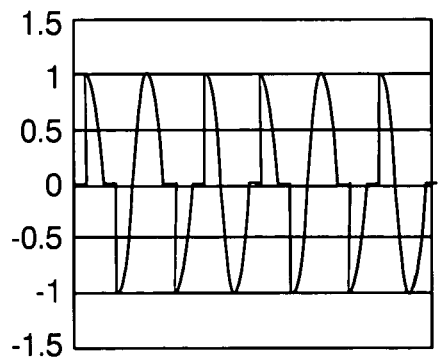
Figure 6L:
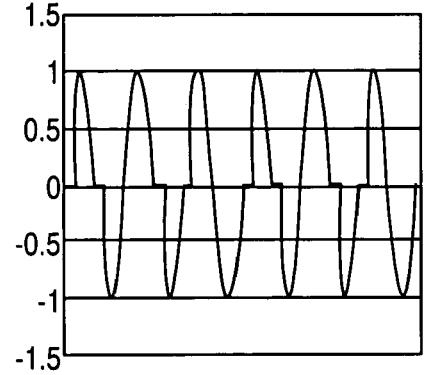
Figure 6M:
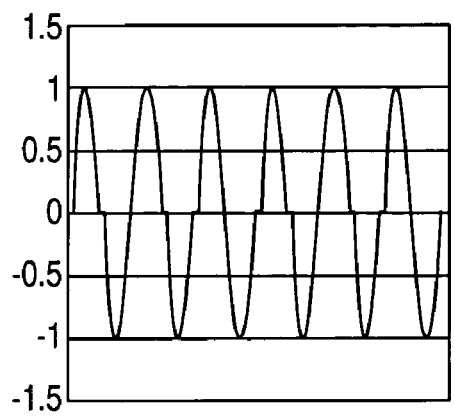
Figure 6N:
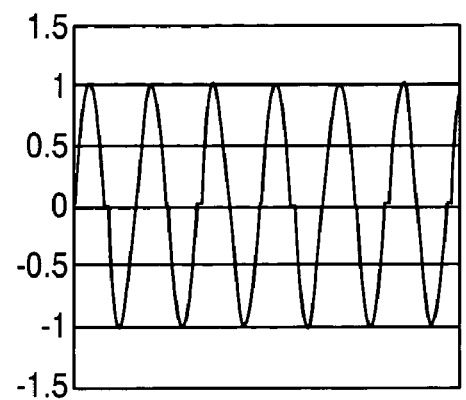
Figure 6P:
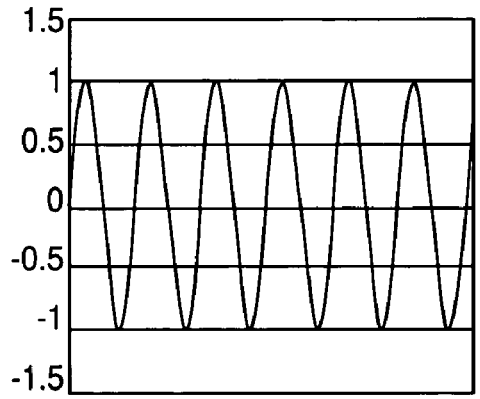

FIGS. 6A–P represent a second example of gating control to create increasing or decreasing effective frequencies and effective voltages. The example of FIG. 6 has been found to be somewhat more compatible with some types of AC induction motors. FIGS. 6A–6E are, as shown in FIGS. 5A–5E, created by gating increasing portions of every third half-cycle. In FIG. 6F, when gating begins for a second half-cycle, a pulse 170 is also gated intermediate to two completed half-cycles and of opposite polarity to the adjacent half-cycle polarity. The gating pulses for FIG. 6F are shown on line 168. As carried forward in FIG. 6G–6N the pulse 170 is expanded along with the main gated half-cycle until in FIG. 6P the completed sine wave is applied to terminal 140.

As discussed above, the increases (decreases) in effective voltage are performed in incremental steps. A feedback loop may be implemented in the system to control the performance of increasing (decreasing) steps when the motor is started or stopped. The feed back is implemented by microcontroller 84 which is pre-programmed to store a time based profile of desired motor start up speeds and stopping speeds. When the microcontroller 84 begins to control the motor to start up, the output of tachometer 110 is compared to the start up profile. When the motor is starting too slowly incremental effective voltage increasing steps will be omitted and the effective voltage will be raised until motor speed matches the start up profile. Similarly, when the motor speed exceeds the start up profile effective voltage increasing steps will be performed more slowly or skipped until the motor is at the profiled speed. Similar feed back corrections are made when the motor is being stopped to approximate the stopping speed profile.

Figure 7:
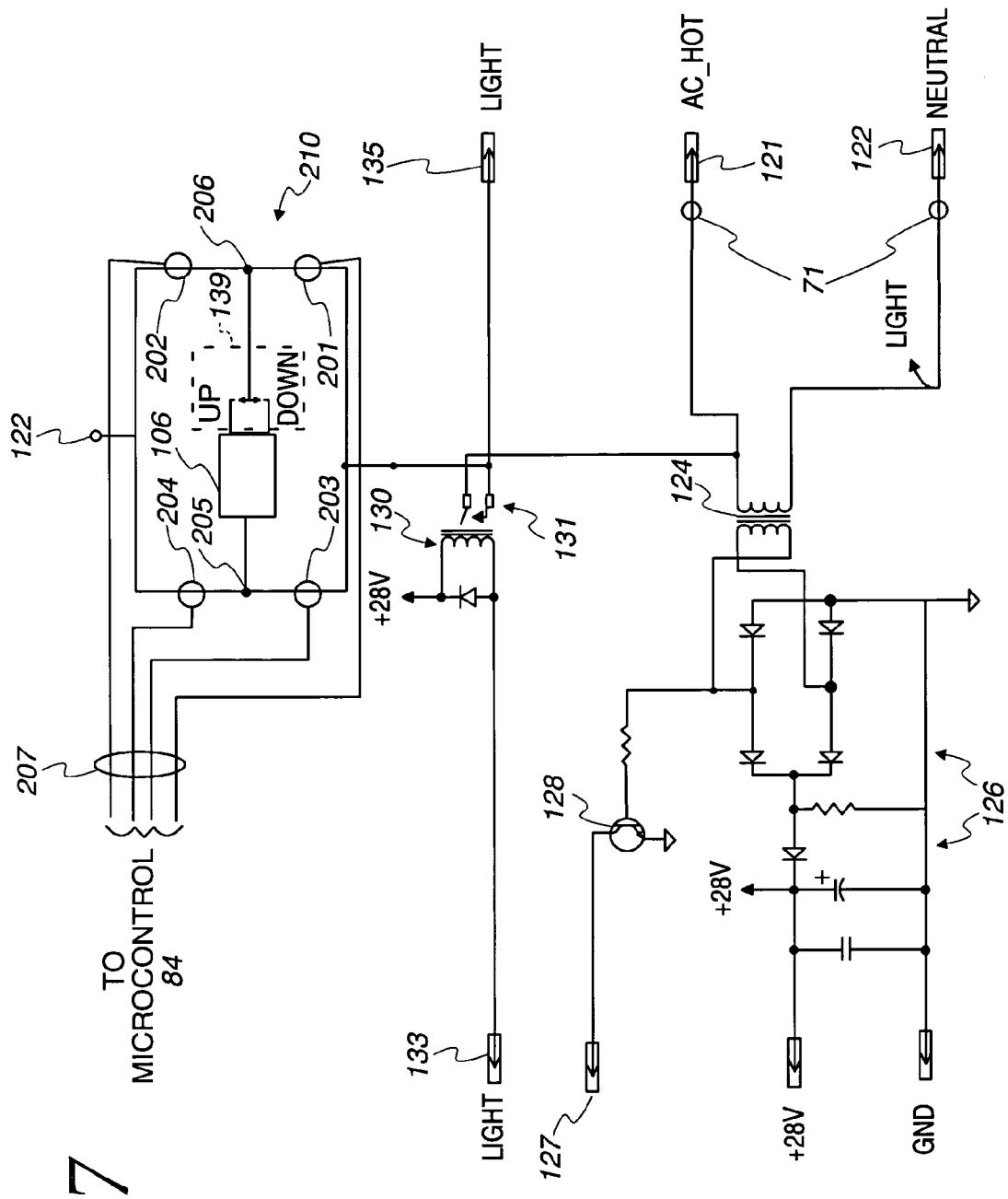
FIG. 7 is a block diagram of an alternative voltage configuration circuit.

In the preceding description the wave form connected to the motor 106 is controlled by voltage configuration circuit 138 in response to gating signals from microcontroller 84. FIG. 7 illustrates an alternative to FIG. 3 which includes an electrical H bridge 210 to configure the mains voltage before it is connected to the motor. The output of terminal 131 of relay 130 is connected to a bottom portion of the H bridge 210 and the top of H bridge 210 is connected to the AC mains neutral terminal. The right side of the H bridge comprises voltage configuration circuits 201 and 202 connected in series and the left side comprises voltage configuration circuits 203 and 204 connected in series. Each voltage configuration circuit 201–204 is substantially identical to voltage configuration circuit 138 of FIG. 3. Each voltage configuration circuit 201–204 is controlled by signals on an individual gating lead which are collectively referred to as leads 207. Leads 207 are connected to receive control signals from microcontroller 84. The neutral terminal of motor 106 is connected to a point 205 of the series connection between voltage configuration circuits 203 and 204 and the up and down terminals of motor 106 are selectively connected to a point 206 in the serial connections between voltage configuration circuits 201 and 202. As in FIG. 3 the state of up/down relay 139 is determined by microcontroller 84. The microcontroller 84 can exert greater control over the wave form applied to motor 106 when the circuit of FIG. 7 is used. For example, wave forms derived from both odd and even half-cycles of the mains voltage can be connected to the motor 106.

What is claimed is:

1. A barrier movement operator comprising:
   an A.C. induction motor coupled to the barrier for controlling the movement of the barrier;
   a source of mains A.C. operating voltage comprising a frequency;
   a motor control apparatus connected to the main operating voltage and the induction motor and responsive to power control signals from a controller for varying the effective frequency of the mains operating voltage coupled to the induction motor; and
   the controller responds to user commands and detected conditions of the barrier for incrementally changing a speed of movement of the barrier by generating power control signals to control the motor control;
   wherein the motor control apparatus operates in synchronism with the frequency of the mains A.C. voltage for varying the effective percentage of line voltage and sub harmonics of the mains A.C. voltage applied to the motor.

2. A barrier movement operator in accordance with claim 1 wherein the motor control apparatus operates in synchronism with the frequency of the mains A.C. voltage for varying the effective frequency of the mains A.C. voltage applied to the motor.

3. A barrier movement operator in accordance with claim 1 wherein the power control signals of the controller are generated in synchronism with the mains A.C. frequency.

4. A barrier movement operator in accordance with claim 1 wherein the motor control apparatus comprises circuitry, responsive to the power control signals for varying the effective voltage of the mains A.C. voltage coupled to the motor.

5. A barrier movement operator in accordance with claim 4 wherein the power control signals are generated by the controller in synchronism with the frequency of the mains A.C. voltage.

6. A barrier movement operator in accordance with claim 1 the motor comprising a rotor for rotating to a first direction and a second direction.

7. A barrier movement operator in accordance with claim 6 comprising direction apparatus for energizing the motor to selectively rotate the rotor in the first or the second direction.

8. A barrier movement operator in accordance with claim 7 wherein the direction apparatus connects the motor control apparatus to the motor.

9. A barrier movement operator in accordance with claim 7 wherein the controller generates motor direction signals for the selective control of the direction apparatus.

10. A barrier movement operator in accordance with claim 1 wherein the mains A.C. operating voltage comprises a recurring sequence of half cycles of alternating polarity occurring at a frequency.

11. A barrier movement operator in accordance with claim 10 wherein the effective frequency of the mains A.C. is coupled to the motor for a portion of every Nth half cycle where N is an odd integer greater than 1.

12. A barrier movement operator in accordance with claim 11 wherein the power of mains A.C. coupled to the motor is increased by increasing the portion of every Nth half cycle from a predetermined minimum amount to a predetermined maximum amount.

13. A barrier movement operator in accordance with claim 11 wherein the effective voltage of the mains A.C. coupled to the motor is periodically increased by incrementally increasing the portion of every Nth half cycle.

14. A barrier movement operator in accordance with claim 13 wherein the incremental increasing continues until all half cycles are coupled to the motor.

15. A barrier movement operator in accordance with claim 12 where the barrier is moved between first and second positions and the predetermined maximum amount for increasing the portion of half cycles is greater when the barrier is moving toward the first position than when the barrier is moving toward the second position.

16. A barrier movement operator in accordance with claim 15 wherein the first position is an open position and the second position is a closed position.

17. A barrier movement operator in accordance with claim 6 comprising apparatus for sensing a rotational speed of the rotor and the controller responds to the sensed rotor speed to generate the power control signals.

18. An A.C. induction motor control apparatus comprising:
    an A.C. induction motor;
    a source of mains A.C. operating voltage comprising a frequency;
    a motor control circuit connected to the mains voltage and the induction motor and responsive to power control signals from a controller for varying the effective frequency of the mains operating voltage coupled to the induction motor; and
    the controller includes a program for incrementally changing a rotational speed of the induction motor by generating power control signals to control the motor control circuit;
    wherein the motor control circuit operates in synchronism with the frequency of the mains A.C. voltage for varying the effective percentage of line voltage and sub harmonics of the mains A.C. voltage applied to the motor.

19. An A.C. induction motor control apparatus in accordance with claim 18 wherein the controller senses the A.C. mains voltage and operates in synchronism with the frequency of the mains A.C. voltage for varying the effective frequency of the mains A.C. voltage applied to the motor.

20. An A.C. induction motor control apparatus in accordance with claim 18 wherein the motor control circuitry comprises gating circuitry, responsive to the power control signals for varying the effective voltage of the mains A.C. coupled to the motor.

21. An A.C. induction motor control apparatus in accordance with claim 18 the motor comprising a rotor for rotating to a first direction and a second direction.

22. An A.C. induction motor control apparatus in accordance with claim 21 comprising direction apparatus for energizing the motor to selectively rotate the rotor in the first or the second direction.

23. An A.C. induction motor control apparatus in accordance with claim 22 wherein the direction apparatus connects the motor control apparatus to the motor.

24. An A.C. induction motor control apparatus in accordance with claim 22 wherein the controller generates motor direction signals for the selective control of the direction apparatus.

25. An A.C. induction motor control apparatus in accordance with claim 21 comprising apparatus for sensing a rotational speed of the rotor and the controller responds to the sensed rotor speed to generate the power control signals.

26. An A.C. induction motor control apparatus in accordance with claim 18 wherein the mains A.C. operating voltage comprises a recurring sequence of half cycles of alternating polarity occurring at a frequency.

27. An A.C. induction motor control apparatus in accordance with claim 26 wherein the effective frequency of the mains A.C. operating voltage is coupled to the motor for a portion of every Nth half cycle where N is an odd integer greater than 1.

28. An A.C. induction motor control apparatus in accordance with claim 27 wherein the power of mains A.C. operating voltage coupled to the motor is increased by increasing the portion of every Nth half cycle from a predetermined minimum amount to a predetermined maximum amount.

29. An AC. induction motor control apparatus in accordance with claim 27 wherein the effective voltage of the mains A.C. coupled to the motor is periodically increased by incrementally increasing the portion of every Nth half cycle.

30. An A.C. induction motor control apparatus in accordance with claim 29 wherein the incremental increasing continues until all half cycles are coupled to the motor.

31. An A.C. induction motor control apparatus comprising:
   an A.C. induction motor;
   a source of mains A.C. operating voltage comprising a frequency;
   a motor control circuit connected to the mains voltage and the induction motor and responsive to power control signals from a controller for varying the effective percentage of the mains voltage and sub-harmonics thereof coupled to the induction motor; and
   the controller includes a program for incrementally changing the speed of the induction motor by generating power control signals to control the motor control circuit.

32. An A.C. induction motor control apparatus in accordance with claim 31 wherein the controller senses the A.C. mains voltage and operates in synchronism with the mains A.C. frequency for varying the effective percentage of the mains voltage and sub harmonics applied to the motor.

33. An A.C. induction motor control apparatus in accordance with claim 31 wherein the motor control circuitry comprises gating circuitry, responsive to the power control signals for varying the effective power of the mains A.C. voltage coupled to the motor.

34. An A.C. induction motor control apparatus in accordance with claim 31 wherein the mains A.C. operating voltage comprises a recurring sequence of half cycles of alternating polarity occurring at a frequency.

35. An A.C. induction motor control apparatus in accordance with claim 34 wherein the effective wave shape of the mains A.C. operating voltage is coupled to the motor for a portion of every Nth half cycle where N is an odd integer greater than 1.

36. An A.C. induction motor control apparatus in accordance with claim 35 wherein the power of mains A.C. operating voltage coupled to the motor is increased by increasing the portion of every Nth half cycle from a predetermined minimum amount to a predetermined maximum amount.

* * * * *

UNITED STATES PATENT AND TRADEMARK OFFICE
CERTIFICATE OF CORRECTION

| | | |
|---|---|---|
| PATENT NO. | : 7,042,183 B2 | Page 1 of 1 |
| APPLICATION NO. | : 10/622214 | |
| DATED | : May 9, 2006 | |
| INVENTOR(S) | : James J. Fitzgibbon et al. | |

It is certified that error appears in the above-identified patent and that said Letters Patent is hereby corrected as shown below:

*IN THE CLAIMS*:

Column 8, Line 51; After "18" insert -- wherein --;

Column 9, Line 16; Change " AC." to -- A.C. --; and

Column 9, Line 31; Change "sub-harmonics" to -- sub harmonics --.

Signed and Sealed this

Twenty-ninth Day of May, 2007

JON W. DUDAS
*Director of the United States Patent and Trademark Office*